United States Patent
Schilit et al.

(10) Patent No.: US 9,215,286 B1
(45) Date of Patent: Dec. 15, 2015

(54) CREATING A SOCIAL NETWORK BASED ON AN ACTIVITY

(75) Inventors: William N. Schilit, Mountain View, CA (US); Roy Want, Los Altos, CA (US); Bay-Wei Chang, Foster City, CA (US); Yang Li, Palo Alto, CA (US); Shumin Zhai, Los Altos, CA (US); Ed Huai-Hsin Chi, Palo Alto, CA (US); Elin R. Pedersen, Portola Valley, CA (US)

(73) Assignee: Goolge Inc, Mountain View, CA (US)

( * ) Notice: Subject to any disclaimer, the term of this patent is extended or adjusted under 35 U.S.C. 154(b) by 597 days.

(21) Appl. No.: 13/307,668

(22) Filed: Nov. 30, 2011

(51) Int. Cl.
  *G06F 15/16* (2006.01)
  *H04L 29/08* (2006.01)
  *H04L 12/58* (2006.01)
  *G06Q 50/00* (2012.01)

(52) U.S. Cl.
  CPC ............... *H04L 67/22* (2013.01); *G06Q 50/01* (2013.01); *H04L 51/32* (2013.01)

(58) Field of Classification Search
  CPC ......... H04L 51/32; H04L 67/22; G06Q 50/01
  USPC .................. 709/204–205, 227–228
  See application file for complete search history.

(56) References Cited

U.S. PATENT DOCUMENTS

| | | | |
|---|---|---|---|
| 7,967,731 B2 * | 6/2011 | Kil .................. | G06Q 30/02 482/1 |
| 8,144,632 B1 * | 3/2012 | Chapweske ......... | H04L 12/1881 370/238 |
| 2010/0057682 A1 * | 3/2010 | Ramsay et al. ............... | 709/204 |
| 2010/0174709 A1 * | 7/2010 | Hansen et al. ................ | 709/204 |
| 2010/0306249 A1 * | 12/2010 | Hill ........................ | G06Q 50/01 707/769 |
| 2011/0112976 A1 * | 5/2011 | Ryan et al. .................... | 709/205 |
| 2012/0060101 A1 * | 3/2012 | Vonog et al. .................. | 715/751 |
| 2012/0101970 A1 * | 4/2012 | Zernik et al. ................... | 706/45 |
| 2012/0136689 A1 * | 5/2012 | Ickman et al. ............... | 705/7.19 |
| 2012/0142428 A1 * | 6/2012 | Wilson et al. .................. | 463/42 |
| 2012/0233257 A1 * | 9/2012 | Ashour et al. ................ | 709/204 |
| 2012/0291049 A1 * | 11/2012 | Park ................... | G06F 17/30324 719/318 |
| 2013/0110737 A1 * | 5/2013 | Shustorovich ......... | G06Q 10/00 705/326 |
| 2013/0203487 A1 * | 8/2013 | Baerlocher ............. | G07F 17/32 463/27 |
| 2014/0129942 A1 * | 5/2014 | Rathod ............ | H04N 21/44222 715/720 |
| 2014/0287400 A1 * | 9/2014 | Dozier et al. ................. | 434/362 |

\* cited by examiner

*Primary Examiner* — Bharat N Barot
(74) *Attorney, Agent, or Firm* — Patent Law Works LLP

(57) ABSTRACT

A system for creating an activity-based social includes receiving information from a computing device of a participant in an activity, and determining that the information qualifies the participant for membership in a social network associated with the activity. The system also includes associating the participant with the social network, and enabling access, by the participant, to an electronic portal that provides access to the social network.

35 Claims, 7 Drawing Sheets

CREATING A SOCIAL NETWORK BASED ON AN ACTIVITY

BACKGROUND

This disclosure relates generally to creating a social network that is based on an activity.

Social networks permit members to post information about themselves and to communicate with other people, e.g., their friends, family, and co-workers. Some social networks permit members to establish communication with other members. Additionally, social networks may provide members with opportunities to interact with other members who are on, or outside of, the social network.

SUMMARY

Described herein is a method, executing on one or more computing devices, which includes receiving, at the one or more computing devices, a request to join a social sub-network from a first participant of one or more event participants. The social sub-network is associated with social sub-network information and the request includes participant information. When the participant information matches the social sub-network information, the first participant is registered with the social sub-network, which enables interaction among the members of the social sub-network. Upon request from the first participant for information related to one or more other members of the social sub-network, the requested information related to the one or more other members of the social sub-network is retrieved. The requested information is sent, using the one or more computing devices, to a computing device associated with the first participant.

The foregoing method may include one or more of the following features, either alone or in combination.

The social sub-network information may be received from event participants other than the first participant. The participant information and the social sub-network information may include at least one of: images, vided near-field communication tokens, quick response codes, input command sequences, a sound-generated token, data corresponding to physical contact between devices, BLUETOOTH signals, global positioning system signals, and received strength indication signals.

The method may also include associating the social sub-network with an icon, through which the social sub-network is accessible. The icon may be incorporated into a stream of icons that is accessible to the first participant. The stream of icons corresponds to activities associated with the first participant. Data may be output to make the stream of icons accessible to the first participant.

Also described herein is a method performed by one or more computing devices for creating an activity-based social network. The method includes identifying, using the one or more computing devices, participants in an activity based on information that is indicative of participation in the activity, and creating a social network associated with the activity. The social network is accessible through an electronic portal. The electronic portal enables interaction among the participants. The method also includes outputting data for the electronic portal to computing devices associated with the participants.

The foregoing method may include one or more of the following features, either alone or in combination.

The social network may be a sub-network of another social network. The method may also include receiving content from one or more of the participants, and providing the content to the participants via the electronic portal. The method may also include associating the social network with an icon through which the social network is accessible, incorporating the icon into a stream of icons that are accessible to at least one of the participants, where the stream of icons corresponds to activities associated with the at least one of the participants, and outputting data to make the stream of icons accessible to the at least one of the participants. The data may include a Web page. The Web page may include features for initiating selective filtering of one or more social networks in the stream in response to a received input.

The information may include a near field communication token that is accessed by computing devices of the participants. The token may be received by the one or more computing devices. The information may include an image of a quick response code. The information may include an entry input by a participant to a computing device. The information may include a token generated from sound information propagated to computing devices of the participants. The information may correspond to to a sequence of operations initiated manually on computing devices of the participants. The information may include data corresponding to physical contact between computing devices by at least two of the participants. The information may include at least one of images and video received from the participants, where at least one of the images and video has at least one feature in common. The information may be obtained through signals output to effect a wireless connection. The information may be based on BLUETOOTH signals, based on global positioning system signals, or based on received signal strength indication signals. The method also may include outputting data to the electronic portal that identifies activities associated with the at least one of the participants.

Also described herein is a method performed by one or more processing devices, which includes receiving information from a computing device of a participant in an activity, determining that the information qualifies the participant for membership in a social network associated with the activity, associating the participant with the social network, and enabling access, by the participant, to an electronic portal that provides access to the social network.

The foregoing method may include one or more of the following features, either alone or in combination.

The method may also include creating an icon corresponding to the activity, which allows access to the social network, incorporating the icon into a stream of icons corresponding to activities associated with the participant; and providing the participant with access to the stream of icons. The stream may include one or more filters associated therewith for selectively filtering, for output, data from social networks associated with the stream.

The information may include a near field communication token. Determining that the information qualifies the participant for membership in a social network may include comparing the near field communication token to one or more other near field communication tokens received from participants in the activity.

The information may include an image of a quick response code. Determining that the information qualifies the participant for membership in a social network may include comparing the image of the quick response code to a stored image of a quick response code.

The information may include an entry input by a participant to a computing device of the participant. Determining that the information qualifies the participant for membership in a social network may include comparing the entry to one or more other entries received from participants in the activity.

The information may include a token generated from sound information propagated to computing devices of the participants. Determining that the information qualifies the participant for membership in a social network may include comparing the token to one or more other tokens received from participants in the activity.

The information may correspond to a sequence of operations initiated manually on computing devices of the participants. Determining that the information qualifies the participant for membership in a social network may include comparing the sequence of operations to one or more other sequences of operations received from participants in the activity.

The information may include data corresponding to physical contact between computing devices by at least two of the participants.

The information may include an image or video. Determining that the information qualifies the participant for membership in a social network may include comparing the image or video to one or more other respective images or video received from participants in the activity.

The information may be based on BLUETOOTH signals, based on global positioning system signals, or based on received signal strength indication signals.

All or part of the systems and techniques described herein may be implemented as a computer program product that includes instructions that are stored on one or more non-transitory machine-readable storage media, and that are executable on one or more processing devices. All or part of the systems and techniques described herein may be implemented as an apparatus, method, or electronic system that may include one or more processing devices and memory to store executable instructions to implement the stated functions.

The details of one or more implementations are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION

Definitions

Figure 1:
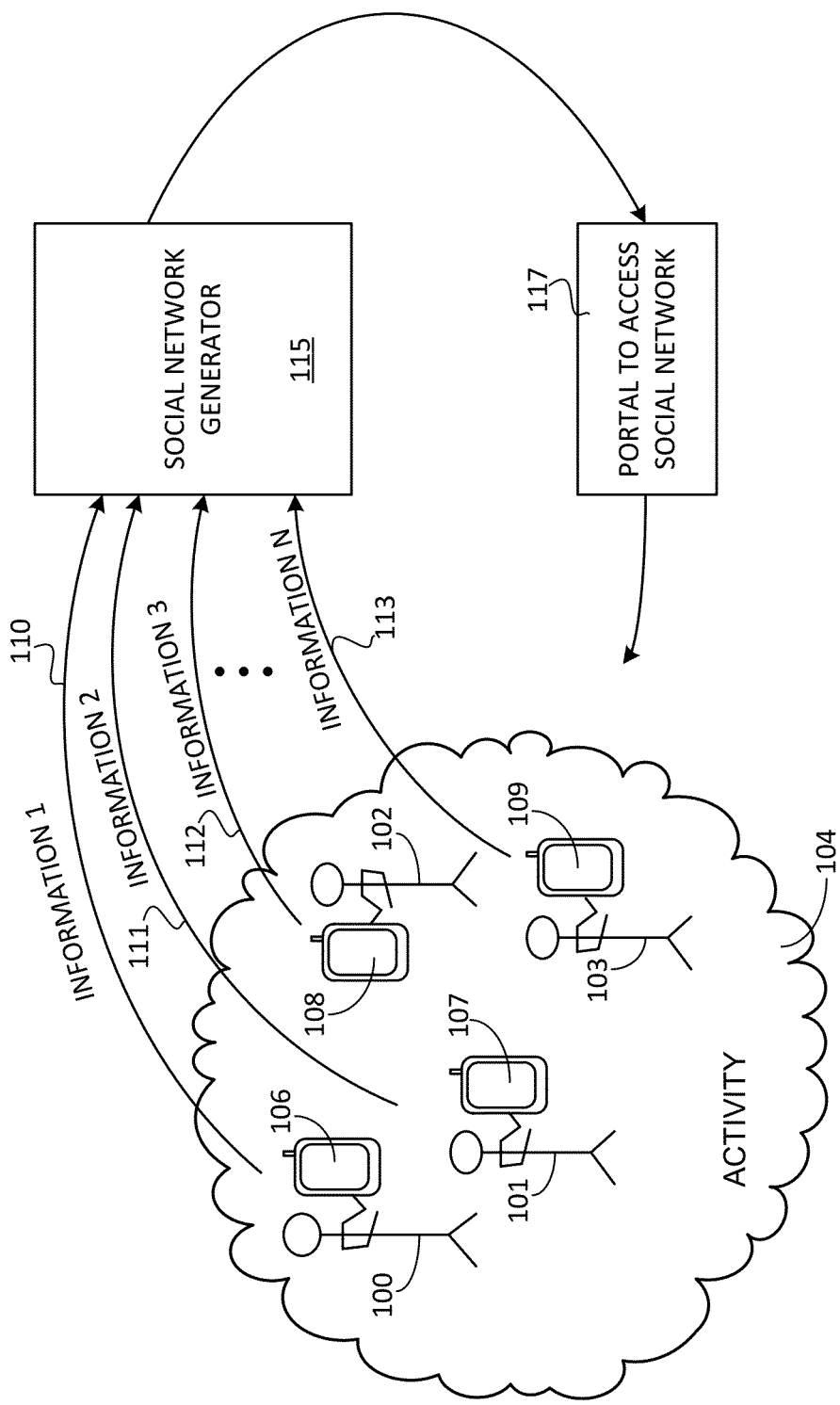
FIG. 1 is a block diagram of a conceptual example of a process for creating an activity-based social network.

The term "'activity" as used herein encompasses its plain and ordinary meaning, including, but not limited to, one or more physical or virtual actions or events.

The term "activity-based social network" as used herein encompasses its plain and ordinary meaning, including, but not limited to, a social network that is created in response to an activity.

The term "activity stream" as used herein encompasses its plain and ordinary meaning, including, but not limited to, a record of actions or events in which a user has participated over a course of time.

The term "computing device" as used herein encompasses its plain and ordinary meaning, including, but not limited to, a programmable machine that is capable of receiving input data, processing the data, and providing an output.

The term "electronic portal" as used herein encompasses its plain and ordinary meaning, including, but not limited to, an electronic gateway to a collection of digital files, services, and/or information.

The term "filter" as used herein encompasses its plain and ordinary meaning, including, but not limited to, one or more software processes for identifying information relevant to an input query.

The term "icon" as used herein encompasses its plain and ordinary meaning, including, but not limited to, a virtual representation of underlying information.

The term "'near field communication'" as used herein encompasses its plain and ordinary meaning, including, but not limited to, data exchange among devices in relatively close physical proximity to each other.

The term "social network" as used herein encompasses its plain and ordinary meaning, including, but not limited to, an electronic service through which individuals or organizations are interconnected, and through which those individuals or organizations may interact.

The term "quick response code" as used herein encompasses its plain and ordinary meaning, including, but not limited to, a two-dimensional matrix bar code.

The term "token" as used herein encompasses its plain and ordinary meaning, including, but not limited to, a collection of data that has an identity and that may be transmitted among devices over a network.

Overview

Described herein are examples of systems for creating an activity-based social network. The social network is activity-based in the sense that the social network is created for participants in an activity. For example, participants in an activity, e.g., a physical event such as a conference or a virtual event such as a game, may wish to establish a forum to enable exchange of information with those who participated in the activity. Accordingly, the participants may establish a social network that participants in the activity can join, and through which information may be exchanged among participants during the activity or in the future.

An activity-based social network may be established through a variety of mechanisms. For example, participants in an activity may use their computing devices in a process for creating the activity-based social network. In some embodiments, the activity-based social network may be a sub-network of an existing social network. Users joining the activity-based social network may or may not already be members of the social network of which the activity-based social network is a sub-network.

Examples of computing devices that may be used are provided below, and include, for example, cellular telephones, smartphones, tablet computers, and televisions having one or more processors embedded therein or attached thereto. By way of example, each participant in an activity (e.g., prospective member of an activity-based social network) may submit, through their respective computing device, information (e.g., an image, token, contact notification, and so forth) to a server. The server may recognize that information as an indication that the participant wishes to create, or join, an activity-based social network, and may either create an activity-based social network or enable the participants to access such an existing social network.

The activity-based social network may be accessed, e.g., through an electronic portal, such as a Web page. For example, members of the social network may be given a password, token, or other key to access such a Web page. Members may sign-on to the Web page and, e.g., upload or download content, interact with other members, and access various resources as is done in other social networks. The activity-based social network may be created through a service, for which various users can register in advance. The service may provide each user with a home page, through which electronic portals for various activity-based social networks and other information may be accessed, as described below.

A social network for an activity may be associated through an icon. The icon may be associated with a link to a corresponding social network. Icons for different activities (e.g., different social networks) may be part of an activity stream, which may be accessed through each user's home page. Through this activity stream, users may access different activity-based social networks. For example, a user may participate in numerous activities, e.g., conferences, parties, online meetings or games, and the like, over a course of time. Each such activity may have a corresponding social network that is represented, in the user's activity stream, by an icon. The activity-based social networks in a user's activity stream may be organized, e.g., chronologically, or in another appropriate order (e.g., by subject matter, number of participants, designated priority, and so forth). As described in more detail below, a user may select an icon in the user's activity stream, and thereby access an activity-based social network corresponding to that icon. Access may be, e.g., through an electronic portal, as described below. Filters may also be associated with the activity stream.

Filters may enable a user to retrieve information from, or about, one or more social networks in the user's activity stream based, e.g., on one or more input search parameters. For example, a user may wish to identify which activities a particular person attended along with, e.g., the role that person played in each activity. The user may then input appropriate search terms, whereafter a search engine or other appropriate mechanism searches data associated with the activity-based social networks in the user's activity stream to identify one or more activity-based social networks that meet the input search criteria.

Conceptual Example

FIG. 1 shows, conceptually, a process for creating an activity-based social network. In the example of FIG. 1, a social network is created for participants 100 to 103 in an activity 104. Activity 104 may include any appropriate physical or virtual activity or activities, as noted above. For example, activity 104 may be an event, such as a meeting, a conference, a party, a sports game, or, simply, a group of people present at a location at a particular time. In other examples, activity 104 may be virtual. For example, activity 104 may include online group, e.g., gamers, bloggers, chatters, or the like, who are in electronic communication over a course of time. In other examples, activity 104 may be a combination of physical and virtual.

In the example of FIG. 1, participants 100 to 103 in activity 104 each have a computing device 106 to 109. Smartphones are depicted in FIG. 1; however, computing devices 106 to 109 may be, or include, any of the computing devices described herein. In this example, information 110 to 113 is sent from each computing device 106 to 109 to a social network generator 115. Social network generator 115 may include one or more computer programs that are executable to identify participants in an activity based on information 110 to 113, to create a social network associated with the activity, and to output an electronic portal 117 (e.g., a Web page) to computing devices 106 to 109 for participants in activity 104.

Information 110 to 113 may be based, e.g., on data obtained from computing devices 106 to 109. In example implementations described below, each computing device 106 to 109 includes an application (or "app") installed thereon. That app may communicate with social network generator 115 in order to enable creating and joining an activity-based social network. For example, to create an activity-based social network, participants in an activity may activate the apps on their respective computing devices 106 to 109. Following their activation, the apps may obtain information for use by social network generator 115 in creating an activity-based social network. Different types of information may be obtained and used, as described in more detail below. Likewise, different mechanisms may be used to obtain the information, as also described in more detail below. Similar actions may be taken to join an existing activity-based social network.

Generally speaking the information that is obtained is deemed to be indicative of participation in an activity. For example, apps on computing devices 106 to 109 may send the same information (e.g., the same image, token, sequence of operations, and the like) to social network generator 115. Social network generator 115 may recognize this information and, based on the content of the information and, e.g., the time frame in which the information is received, determine that the computing devices that sent the information are attempting to create, or join, an activity-based social network. In that case, social network generator 206 may identify participants in the activity, e.g., based on information obtained from their computing devices, and associate those participants with an activity-based social network created specifically for activity 104.

If all of the participants in the activity are part of an existing social network, social network generator may create a social sub-network within that existing social network. That social sub-network may be an activity-based social network of the type described herein. In this example, social network generator 115 may obtain, with the users' permission, login information for user accounts on the existing social network, and interact with that existing social network to create the social sub-network. In this example, access to the social sub-network may be through the existing social network.

If all of the participants in the activity are not part of an existing social network, social network generator 115 may create a new activity-based social network for the activity, which is unaffiliated with an existing social network. The new activity-based social network may be accessed through one or more electronic portals (e.g., Web pages) provided by social network generator 115.

In this regard, social network generator 115 may provide, to members of an activity-based social network, an electronic portal (e.g., a Web page) or a uniform resource locator (URL) therefor, along with login information (e.g., a user identifier, password, token, key, or the like) to enable those members to access the activity-based social network through the electronic portal. Such information may be provided, e.g., directly to the participants' computing devices via any appropriate form of electronic communication, such as electronic mail, simple messages service (SMS) "text" messages, or the like. Alternatively, that information may be made accessible to members through other accounts, e.g., through their existing social network accounts in the example provided above.

Members may access the activity-based social network using, e.g., a Web browser and the login information. The activity-based social network may be used, e.g., to share content, communicate, access resources, and so forth. The activity-based social network may be accessed, e.g., during the activity for which it was created or in the future (e.g., after the activity for which the activity-based social network was created has ended). For example, as noted, social network generator 115 may associate the social network with icon. The icon may be incorporated into an activity stream containing social networks of which the user is a member. The activity stream may be displayed, e.g., on an electronic portal, such as a Web page, and may include, among other things, access to icons corresponding to activity-based social networks that were created over a time span. For example, a user may have participated in activities (e.g., conferences) in January 2010, February 2010, July 2010, and March 2011. A social network may have been created for each of these activities. A graphical representation of an icon corresponding to each social network (e.g., the social networks for each of the January 2010, February 2010, July 2010, and March 2011 activities) may be incorporated into the user's activity stream. The graphical representations may be displayed in any appropriate order, and used to access the corresponding activity-based social networks.

Icons corresponding to the various social networks may include data, or have metadata associated therewith, that relates to one or more attributes of the corresponding activity-based social networks. For example, for a particular activity-based social network, the data may identify the location of the corresponding activity, the date of that activity, participants in the activity, information about the participants (e.g., their contact information, title, and the like), the subject of the activity, and so forth. As noted above, and as described in more detail below, filters may be associated with the activity stream, and may be used to filter data associated with the social networks to identify a social network relevant to an input query.

The systems and processes described herein, and variations thereof, may be implemented in any appropriate electronic system, with any appropriate computing devices and computing equipment. An example of such a system is described below with respect to FIG. 2. Other systems, however, may be used.

Example System Implementation

Figure 2:
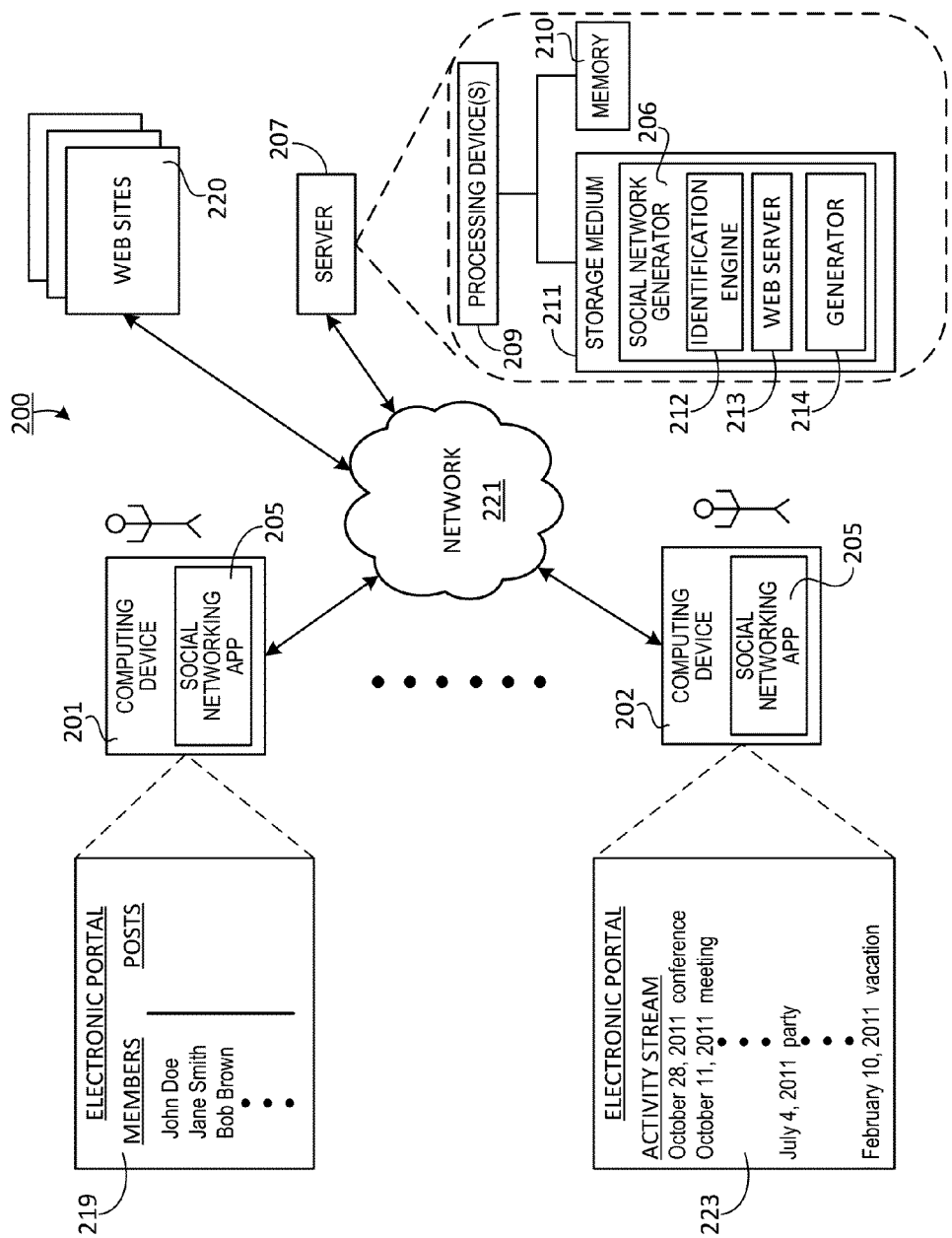
FIG. 2 is a block diagram of an example system on which processes for creating an activity-based social network may be implemented.

FIG. 2 is a block diagram of an example of a system 200 on which the process depicted conceptually in FIG. 1 may be implemented. In the example of FIG. 1, computing devices 201 and 202 are mobile computing devices. Generally, however, the computing devices can be or include any appropriate type of computing device, examples of which include a desktop computer, a laptop computer, a tablet computer, a handheld computer, a personal digital assistant (PDA), a cellular telephone, a network appliance, a camera, a smart phone, a television having one or more embedded or attached processors, an enhanced general packet radio service (EGPRS) mobile phone, a media player, a navigation device, an email device, a game console, or a combination of two or more of these data processing devices or other appropriate data processing devices. In some implementations, the computing device can be part of a motor vehicle (e.g., an automobile, an emergency vehicle (e.g., fire truck, ambulance, a bus). Although only two computing devices are depicted specifically in FIG. 2, system 200 can include any number of computing devices.

Each of computing devices 201 to 202 may include one or more processing devices, memory, and a storage system (not shown). Each storage system can include an operating system (OS), and a social networking application (app) 205 for, e.g., creating, joining, and interacting with the activity-based social networks described herein. To this end, app 205 interacts with social network generator 206, which may be stored on one or more server(s) 207, and which may be the same as, or similar to, social network generator 115 of FIG. 1. App 205 may be pre-stored on each computing device, downloaded from a remote source, such as an online store, or obtained by any other appropriate mechanism. In other examples, the functionality of app 205 may be part of an operating system for a corresponding computing device.

Server 207 can represent various forms of servers, e.g., a Web server, an application server, a proxy server, a network server, or a server farm. Server 207 can include one or more processing devices 209, memory 210 and a storage medium 211. Server 207 stores computer program(s) for creating, joining, and maintaining activity-based social networks of the type described herein. In this example, the computer programs include a social network generator 206. In this example, social network generator 206 includes executable instructions for identifying participants in an activity based on information that is indicative of participation in the activity, creating an activity-based social network associated with the activity, and outputting, to computing devices associated with the participants, data for an electronic portal 219 for use in accessing the activity-based social network.

To this end, social network generator 206 may include an identification engine 212. Identification engine 212 receives, e.g., from each app 205 on a corresponding computing device, information indicating creation of, or desire to join, an activity-based social network. Identification engine 212 determines whether the received information qualifies the corresponding user for membership in an activity-based social network. The information may be of the type described below. A Web server program 213 hosts a Web site providing electronic portals for accessing activity-based social networks. A generator 214 associates activity-based social networks with icons that are incorporated into an activity stream 223 of a user. The activity stream is accessible to a user, e.g., through app 205 and/or an electronic portal output by Web server program 213. Operation of components of social network generator 206 is described in more detail below.

Web server program 213 may be accessible through network 221 using a Web browser or appropriate Web services. Network 221 can represent one or more communications networks that can allow devices (e.g., computing devices 201 to 202) to communicate, through a communication interface (not shown) which may include digital signal processing circuitry, with web server program 213. The network(s) of network 221 may be wired and/or wireless, and provide for communications under various modes or protocols, e.g., Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver. In addition, short-range communication may occur, e.g., using a BLUETOOTH, WiFi, or other such transceiver.

Also shown in FIG. 2 are various Web sites 220, which are accessible to computing devices 201 to 202. Web sites 220 may include, e.g., previously-created activity-based social networks. Web sites 220 may also include sites that are referenced by, or accessible by, members of activity-based social networks.

Example Process for Creating a Social Network

Figure 3:
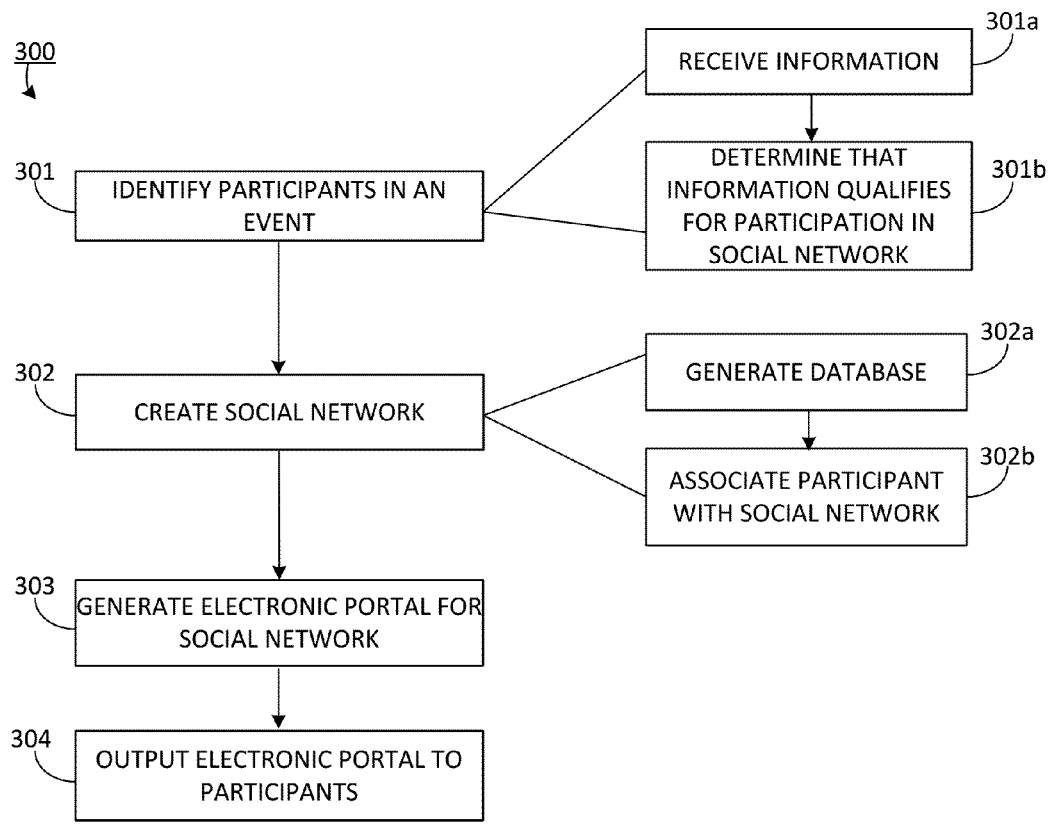
FIG. 3 is a flowchart of an example process for creating an activity-based social network

FIG. 3 is a flowchart showing an example process 300, which may be performed to create an activity-based social network. Process 300, or a portion thereof, may be performed by social network generator 206 in conjunction with one or more apps 205 running on computing devices 201 to 202 of prospective activity-based social network members.

Process 300 includes identifying (301) participants in an activity. The identification (301) may include, e.g., receiving (301a) information from computing devices associated with the participants, and determining (301b) that the received information qualifies the sender for membership in an activity-based social network. The information may be received wirelessly over network 221 of FIG. 2 or by any other appropriate mechanism. The information may be sent, from each computing device, in response to some action taken by a user of the computing device. The action may be, e.g., common to all participants in the activity, and result in similar (or identical) information being transmitted from the respective computing devices to social network generator 206. For example, participants in an activity may wish to create, or join. an activity-based social network specific to a conference held on a particular date. Each participant desiring to become a member of the social network may active a computer program (such as app 205) on their computing device. Following activation, an action may be taken by each user with respect to their computing device, following which app 205 provides appropriate information from the user's computing device to social network generator 206. Such information may trigger creation of an activity-based social network.

A prospective member of an activity-based social network may set the criteria for participation in the activity-based social network. For example, it may be decided that only participants in the activity who join within a certain time frame may be part of a current activity-based social network. In some examples, the criteria may be set by the first user to initiate creation of the activity-based social network. The information for setting the criteria may be input by that user, or that information may be retrieved from a service profile for that user.

In some examples, participants in the activity may select, e.g., via app 205, one or more actions to trigger creating and joining an activity-based social network. In other examples, the app need not provide alternatives, but rather may use a single type of action to trigger creating and joining a social network. Example actions that trigger creating and joining an activity-based social network may include, but are not limited to, one or more of the following.

In an example, in response to activation of app 205 on two or more computing devices, a near-field communication token may be transmitted among all computing devices with the app activated. Near-field communication is a peer-to-peer protocol in which two devices touch or move within a certain proximity of each other (e.g., two centimeters) to exchange tokens. Examples of tokens that may be exchanged include, but are not limited to, text, uniform resource indicators, business cards, a text token having a format representing a command from a social network, and so forth). In some example implementations, the token can be propagated through one person performing a peer-to-peer action with other people in a group in sequence, or it can be passed from one person to another person in a chain or in a tree-like fashion (e.g., for faster propagation). The token could also be contained in a passive near-field communication tag that is placed, e.g., on a conference table, and that is scanned by prospective members of a location-based social network. That token may also be transmitted, from each computing device, to social network generator 206. The token is also passed to, and received, e.g., by identification engine 212, and is used to determine that each user, whose computing device transmitted the token, is requesting to be part of an activity-based social network. Any appropriate type of data, message or communication may be substituted for the near-field communication token.

In another example, after activation of app 205 on two or more computing devices, each user may obtain an image of a quick response code, and send that image to social network generator 206. For example, the quick response code may be captured using a camera on each user's computing device. Alternatively, the image of the quick response code may be obtained from another source. For example, the image may be downloaded from a Web site, received electronically from other participants in the activity, and so forth. The image of the quick response code may be transmitted, from each computing device, to social network generator 206. The image of the quick response code is received, e.g., by identification engine 212, and is used to determine that each user, whose computing device transmitted the image of the quick response code, is requesting to be part of an activity-based social network.

In another example, after activation of app 205 on two or more computing devices, each user may obtain an image, and send that image to social network generator 206. For example, participants in the activity may agree to establish the activity-based social network using a common image. The image may be of any appropriate person, place or thing. For example, participants in the activity may agree to establish the activity-based social network using an image of a chandelier in a conference room. In this example, each participant in the activity may capture an image of the chandelier using a camera on each corresponding computing device. In another example, participants in the activity may agree to establish the activity-based social network using an image of a celebrity, which may be downloaded, e.g., from the Internet. In another example, participants in the activity may agree to establish the activity-based social network using more than one image, e.g., a captured image, such as a chandelier and a downloaded image, such as a celebrity. In any case, an image (or multiple images) is transmitted, from each computing device, to social network generator 206. The image is received, e.g., by identification engine 212, and is used to determine that each user, whose computing device transmitted the image, is requesting to be part of an activity-based social network. The determination process, in this example, may include, e.g., removing extraneous content to obtain the central focus of an image (e.g., a chandelier) or, in the case of a person, performing a facial recognition process to identify the person. Instead of, or in addition to, image(s), common video may be sent from each computing device, and used to identify prospective participants in a location-based social network. For example, the same video (or a portion thereof) received from multiple prospective participants may indicate a desire to join and/or create a location-based social network.

In another example, after activation of app 205 on two or more computing devices, each user may enter information into their respective computing device, and send that information to social network generator 206. For example, participants in the activity may agree to establish the activity-based social network using commonly-input information. For example, the users may agree to establish the activity-based social network through users inputting text (e.g., a random number, word, alphanumeric code), through users shaking their computing devices (thereby triggering responses by accelerometers in the respective devices), through speech or other audio input, or through some other user-initiated input. For example, users who are remote from each other, and who are participating in an online game, may all input the game's score into their respective apps as input for creating or joining an activity-based social network. Information corresponding to the input is transmitted, from each computing device, to social network generator 206. The information is received, e.g., by identification engine 212, and is used to determine that each user, whose computing device transmitted the input, is requesting to be part of an activity-based social network.

In a variation on the foregoing example, the commonly-input information may include a sequence of operations initiated manually or automatically on computing devices of the participants. For example, participants in the activity may agree to establish the activity-based social network based on a sequence of operations. The operations may include any appropriate operation that can be performed using a computing device. For example, the operations may include entering random text, followed by shaking the computing device, followed by taking an image. The app running in each respective computing device identifies this sequence of operations (and, not necessarily, the content resulting from those operations) as an indication that the user of the computing device would like to create or join an activity-based social network. Accordingly, appropriate information is transmitted, from each computing device, to social network generator 206. The information is received, e.g., by identification engine 212, and is used to determine that each user, whose computing device transmitted the information, is requesting to be part of an activity-based social network.

In another example, after activation of app 205 on two or more computing devices, the apps may generate a tone, which is output from a speaker of each respective computing device. The tone may be within the range of human hearing, or at frequencies above or below which humans can hear. The tone may be propagated from one computing device to another, being captured, at each respective computing device, through, e.g., a microphone on that computing device. In response to the tone, the app in each respective computing device may generate data, such as a token. That token may be transmitted, from each computing device, to social network generator 206. The token may be received, e.g., by identification engine 212, and may be used to determine that each user, whose computing device transmitted the token, is requesting to be part of an activity-based social network.

In a variation of the foregoing example, a tone from one computing device (e.g., an initiating device) may cause generation of a token in a recipient (e.g., a first receiving device). That token may then be transmitted among the computing devices, in lieu of the tone, and used in creating or joining an activity-based social network in the manner explained above.

In another example, after activation of app 205 on two or more computing devices, participants in an activity may physically contact their computing devices, e.g., "bump" their computing devices together. In this example, this physical contact causes information to be provided, e.g., from each respective computing device or from a remote source to social network generator 206. In this regard, such technology includes processes that monitor accelerometers in computing devices, and that use matching processes running, e.g., in a remote server, to match any two computing devices that physically contact each other. The information generated in response to such contact (e.g., "bumping") is received, e.g., by identification engine 212, and is used to determine that each user, whose computing device corresponds to that information, is requesting to be part of an activity-based social network.

In another example, computing devices of participants in an activity may support one or more wireless protocols, such as BLUETOOTH. Following activation of the apps, participants in an activity may attempt, within a period of time, to establish a wireless connection to one or more devices. The app in each computing device may detect such an attempt, whether successful or not, and generate information indicating that the attempt was made. This information may be transmitted, from each computing device, to social network generator 206. The information is received, e.g., by identification engine 212, and is used to determine that each user, whose computing device transmitted the information, is requesting to be part of an activity-based social network.

In another example, after activation of app 205 on two or more computing devices, social network generator 206 may use global positioning system (GPS) coordinates to identify computing devices within a range of each other and which have their apps are activated. Users may configure the apps to enable this feature or to disable this feature if a user does not want their GPS coordinates used. In response to detecting that computing devices with activated apps are within a range of each other, social network generator 206 may create an activity-based social network for those users, or cause them to join an existing activity based social network. The activity-based social network may be created automatically (e.g., without further user input) or interactively (e.g., with further user input). In some embodiments, users will not be considered for inclusion (e.g., based on position of their devices or other data) in an activity-based social network unless they have opted-into the process. In other embodiments, users will be considered for inclusion in the activity-based social network unless they have opted-out of possible consideration.

In this regard, social network generator 206 may query each user, through their respective computing device, as to whether they would like to be part of a specified activity-based social network. Each such user may reply in the affirmative or negative. Alternatively, users may be promoted to input additional information, such as a password, code, image, speech or the like, that, e.g., may be agreed upon beforehand by those who would like to create or join an activity-based social network. This information may be transmitted, from each computing device, to social network generator 206. The information is received, e.g., by identification engine 212, and is used to determine that each user, whose computing device transmitted the information, would like to be part of the activity-based social network.

In another example, received signal strength indication (RSSI) fingerprints may be used to provide information for use in establishing an activity-based social network. For example, the interior of a building can be mapped by triangulating among, e.g., three known wireless access points. The location of a user's computing device relative to those access points may be determined based on this mapping. For participants in an activity inside such a building, apps in their computing devices identify their locations (using, e.g., GPS coordinates of a building and local coordinates within the building determined using the RSSI fingerprints), and provide that information to social network generator 206. Social network generator 206 determines that the users' computing devices are within a range of each other. In response to detecting that computing devices with activated apps are within a range of each other within the building, social network generator 206 may automatically establish an activity based social network for those users, or cause them to join an existing activity based social network. As above, the activity-based social network may be created automatically (e.g., without further user input) or interactively (e.g., with further user input).

In this regard, social network generator 206 may query each user, through their respective computing device, as to whether they would like to be part of a specified activity-based social network. Each such user may reply in the affirmative or negative. Alternatively, users may be prompted to input additional information, such as a password, code, image, speech, or the like, that, e.g., may be agreed upon beforehand by those who would like to create or join an activity-based social network. This information may be transmitted, from each computing device, to social network generator 206. The information is received, e.g., by identification engine 212, and is used to determine that each user, whose computing device transmitted the information, would like to be part of an activity-based social network.

In some examples, any appropriate combination of two or more of the foregoing actions may be used to create or join an activity-based social network. For example, GPS coordinates in combination with a near-field communication token may be used, a quick response code in combination with an image may be used, and so forth.

Referring back to FIG. 3, following receipt (301*a*) of information in response to an action, process 300 determines (301*b*) whether the received information qualifies the corresponding user for participation in an activity-based social network. This aspect of process 300 may be performed, e.g., by identification engine 212 of social network generator 206. In an example, process 300 receives information from computing devices of prospective members in an activity-based social network. Process 300 performs a recognition process on the received information to determine whether the received information meets the requirements for creating or joining an activity-based social network. For example, where common information (e.g., text, codes, tokens, images, entries, sequences of operations, and so forth) is received from computing devices, process 300 determines (301*b*) whether information from the computing devices is such that it would permit participation in an activity-based social network.

In an example implementation, information that is received (301*a*), within a time frame, from different computing devices may be compared in order to determine if the information is the same or similar enough to be deemed the same. In this regard, in some examples, identity of information is not necessary, e.g., if 90% of two images are the same, those images may be deemed the same by process 300. The time frame may be set beforehand by social network generator 206, or it may be received, e.g., from a first user initiating creation of the activity-based social network. Alternatively, there may be no time frame, in which cases users may joint an activity-based social network at any time following its creation.

The foregoing comparison may be performed, e.g., by identification engine 212. In an example, the comparison may include comparing, to each other, near-field communication tokens received from different computing devices to determine if the same near-field communication token has been received from each computing device. If the same near-field communication token has been received from each computing device, process 300 determines that that the corresponding users are creating, or joining, an activity-based social network. In another example, the comparison may include comparing received near-field communication tokens to a predefined near-field communication token. If the received near-field communication tokens match the predefined near-field communication token, process 300 determines that that the corresponding users are creating, or joining, an activity-based social network.

In an example, the comparison may include comparing, to each other, quick response codes received from different computing devices to determine if the same quick response code has been received from each computing device. If the same quick response code has been received from each computing device, process 300 determines that that the corresponding users are creating, or joining, an activity-based social network. In another example, the comparison may include comparing received quick response codes to a predefined quick response code. If the received quick response codes match the predefined quick response code, process 300 determines that that the corresponding users are creating, or joining, an activity-based social network.

In an example, the comparison may include comparing, to each other, images received from different computing devices to determine if the same image has been received from each computing device. If the same image has been received from each computing device, or at least part of the received images match each other, process 300 determines that that the corresponding users are creating, or joining, an activity-based social network. In another example, the comparison may include comparing received images to a predefined image. If the received images match the predefined image, or at least part of the received images match the predefined image, process 300 determines that that the corresponding users are creating, or joining, an activity-based social network.

In an example, the comparison may include comparing, to each other, commonly-input information received from different computing devices to determine if the same commonly-input information has been received from each computing device. If the same commonly-input information has been received from each computing device, or at least part of the commonly input information matches, process 300 determines that that the corresponding users are creating, or joining, an activity-based social network. In another example, the comparison may include comparing received commonly-input information to predefined commonly-input information. If all or part of the received commonly-input information matches the predefined commonly-input information, process 300 determines that that the corresponding users are creating, or joining, an activity-based social network.

In an example, the comparison may include comparing, to each other, sequences of operations received from different computing devices to determine if the same sequence of operations has been received from each computing device. If all or part of the same sequence of operations has been received from each computing device, process 300 determines that that the corresponding users are creating, or joining, an activity-based social network. In another example, the comparison may include comparing received sequence of operations to a predefined sequence of operations. If all or part of the received sequence of operations matches the predefined sequence of operations, process 300 determines that that the corresponding users are creating, or joining, an activity-based social network.

In an example, the comparison may include comparing, to each other, RSSI identifiers received from computing devices to determine if RSSI identifiers within a range (which may be set, e.g., by social network generator) have been received from each computing device. The range may be, e.g., within any appropriate maximum distance from others in a group or within any appropriate maximum distance from an average of coordinates of all users in the group or a subset thereof. If RSSI identifiers within the range have been received from each computing device, process 300 determines that that the corresponding users are creating, or joining, an activity-based social network.

In an example, the comparison may include comparing, to each other, GPS coordinates received from different computing devices to determine if GPS coordinates within a range (which may be set, e.g., by social network generator) have been received from each computing device. The range may be, e.g., within any appropriate maximum distance from others in a group or within any appropriate maximum distance from an average of coordinates of users in the group, or a subset thereof. If GPS coordinates within the range have been received from each computing device, process 300 determines that that the corresponding users are creating, or joining, an activity-based social network.

In an example, the comparison may include comparing, to each other, information about attempts at wireless connection received from different computing devices. If the attempts have the same or similar characteristics, e.g., the attempts occurred within a specified time frame; the attempts were to connect to the same devices, and so forth, process 300 determines that that the corresponding users are creating, or joining, an activity-based social network.

In an example, the comparison may include comparing information generated in response to computing devices physically contacting each other in order to determine if that information is indicative of a desire to create or join an activity-based social network. For example, if an app 205 is activated on each user's computing device, and contact occurred for those computing devices, resulting contact information may be transferred to social network generator 206 and compared to contact information of other computing devices. If a string of computing devices are identified, and contacts occurred among those computing devices, process 300 determines that that the corresponding users are creating, or joining, an activity-based social network. By way of example, two smartphones, A and B may contact, resulting in information transfer to social network generator 206. Smartphone B may then contact another smartphone C, resulting in information transfer to social network generator 206. The information transferred to social network generator 206 may identify the smartphones themselves and when the contacts occurred. From this information, social network generator may be able to determine, e.g., that A contacted B at 12:00, that B contacted C at 12:03, and so forth for other computing devices. If this chain of actions occurred within an acceptable time frame, process 300 determines that that the corresponding users are creating, or joining, an activity-based social network.

Referring back to FIG. 3, after process determines (301b) that the received information qualifies corresponding users for participation in an activity-based social network, process 300 creates (302) the activity-based social network. Social network generator 206 may be used to create the activity-based social network. The activity-based social network includes participants who were identified (301), e.g., through actions, such as those described above or other appropriate actions. The identities of the participants are associated with the activity-based social network. Participant identifiers may be obtained, e.g., through information entered into app 205, through information obtained when registering for the service associated with app 205, through information obtained from a computing device (e.g., Internet Protocol address or the like), or any other appropriate identification mechanism. Users may opt-in, or opt-out of, having personal information collected and used for the purposes described herein.

Process 300 generates (302a) a database for the activity-based social network, and associates (302b) participants with the database. In this way, the participants may be registered with the activity-based social network. The database may include identification and other information associated with the activity-based social network. For example, the database may identify the activity for which the activity-based social network is based. By way of example, participants at a conference in July 2011 may generate and activity-based social network for that conference. The database, in this example, may identify the name of the conference, the date of the conference, the duration of the conference, all participants of the conference, subject matter associated with the conference, papers or other presentations provided at the conference, links to information relating to the conference and other related conferences, and so forth. The database may also include information about participants in the activity-based social network. Information about participants in the activity-based social network may include, e.g., their names, titles, occupations, ages, contact information, and so forth. The information may be provided voluntarily by the participants. Participants may be given the option to limit visibility of that information in any appropriate manner. Participants may opt-in to, or opt-out of, automatic information collection, thereby either permitting such information to be made available through the activity-based social network or preventing such information from being made available through the activity-based social network.

Figure 4:
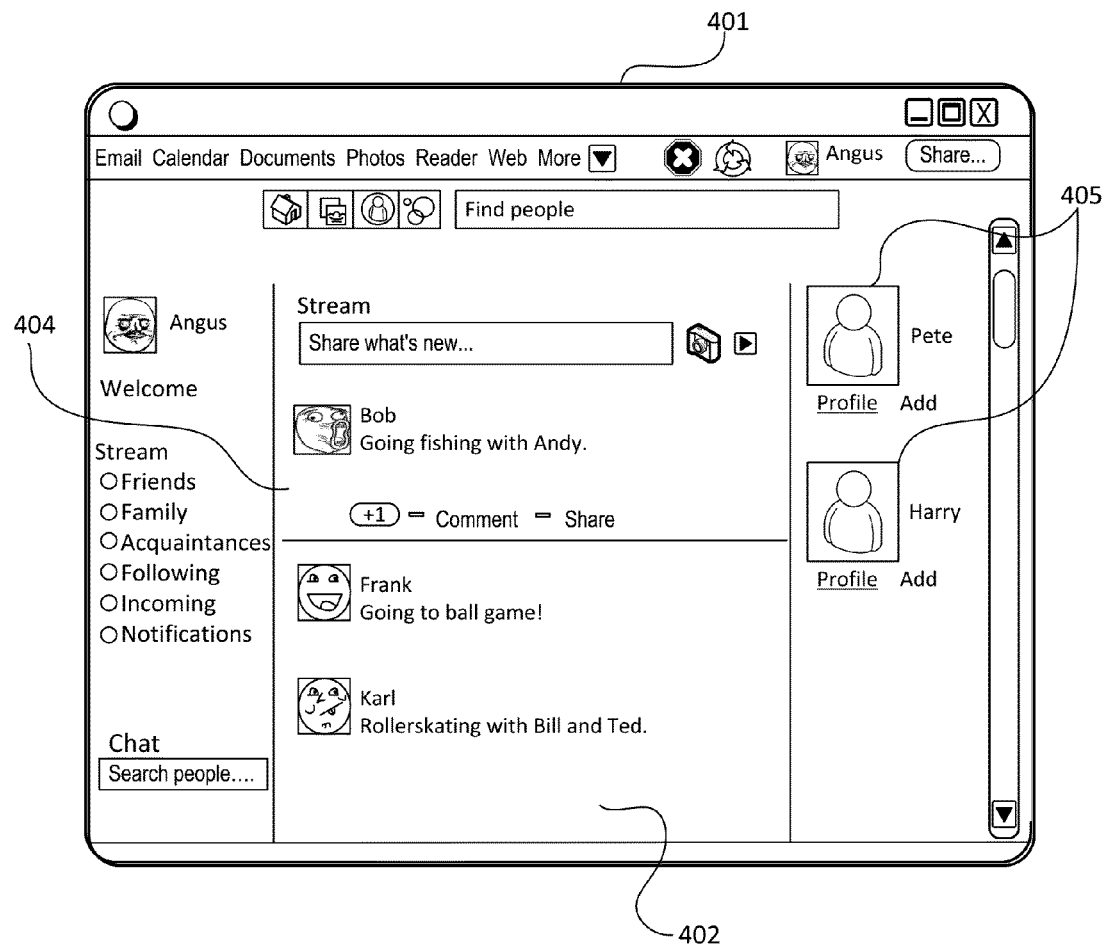
FIG. 4 is an example of an electronic portal for use in accessing features of an activity-based social network.

Process 300 generates (303) an electronic portal for the activity-based social network. This aspect of process 300 may be performed, e.g., by Web server program 213 (FIG. 2). The electronic portal may be a Web page or other appropriate portal. An example of an electronic portal that may be generated by process 300 is shown in FIG. 4, which is described in more detail below. Process 300 outputs (304) data for use in generating the electronic portal to members of the activity-based social network. Initially, that data may be output to the computing devices that were used to generate or join the activity-based social network. The IP addresses of those devices, for example, may be used to identify them to process 300.

The electronic portal may initially include, e.g., an option (not shown) by which a user accepts membership in the activity-based social network. In response to selecting this option, a member may confirm that they wish to join the activity-based social network. The initial electronic portal may include information, such as a login identifier and password. This information may be used by each member to login to the activity-based social network, to change their password, and so forth. Once logged-in to the activity-based social network, members may interact with other members in ways similar to conventional social networks. For example, members may communicate with other members, upload information, exchange information with other members, provide status updates, use services provided by the activity-based social network, and so forth. A portal for an activity-based social network may include, e.g., links to businesses or other services that may be relevant to members of the activity-based social network or the corresponding activity that resulted in creation of the activity-based social network.

FIG. 4 shows an example of an electronic portal 401 for an activity-based social network. As shown in FIG. 4, electronic portal 401 includes an area 402 for sharing information, an information stream 404 through which users can interact with others, and so forth. Member profiles may also be accessed, e.g., using one-boxes 405, or through other appropriate mechanisms.

Example Process for Maintaining an Activity Stream

Figure 5:
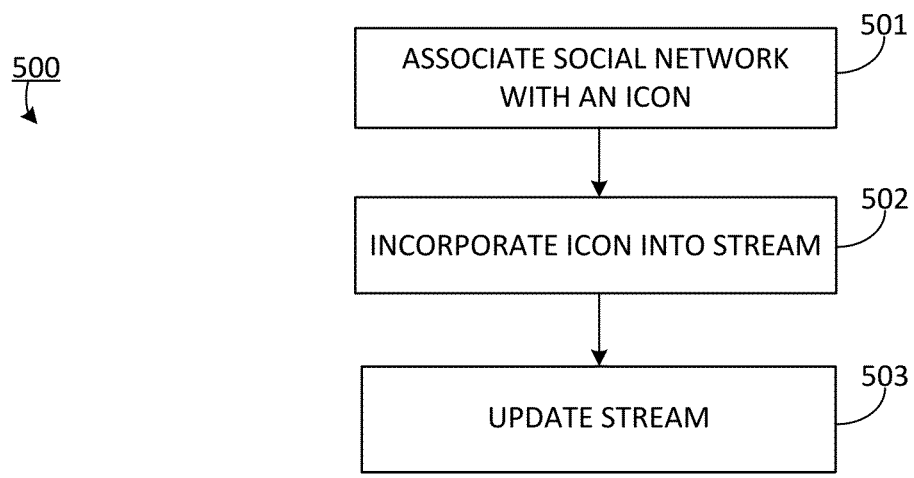
FIG. 5 is a flowchart of an example process for maintaining an activity stream that includes activity-based social networks.

Over the course of time, a user may be part of numerous activity-based social networks. The activity-based social networks may persist, such that they exist beyond the activity for which they were created. To allow for future access to such activity-based social networks, each activity-based social network may be associated with an icon. More specifically, referring to FIG. 5, process 500 associates (501) activity-based social networks with corresponding icons. This aspect of process 500 may be performed, e.g., by generator 214 (FIG. 2). The icons may be displayed, e.g., on an electronic portal, such as a Web page. These icons may be selectable (e.g., through touching, clicking, etc.) to enable access to the activity-based social networks that they represent. For example, upon selecting such an icon, an electronic portal corresponding to the respective activity-based social network may be displayed, through which a user may sign-into, and thereby access, the corresponding activity-based social network. Names of the icons may be representative of the activities for which the corresponding activity-based social networks were created. For example, an activity-based social network for a game played on Jul. 4, 2011 may be named "Jul. 4, 2011 game".

Metadata may be associated with each icon to identify the corresponding activity-based social network. For example, the date of the activity may be included in the metadata, along with, e.g., the name of the activity-based social network, participants in the activity-based social network, information about the participants, a description of the activity-based social network (e.g., its subject, such as "conference", "meeting" or "game"), and so forth. Any appropriate metadata may be associated with an icon for an activity-based social network.

Figure 6:
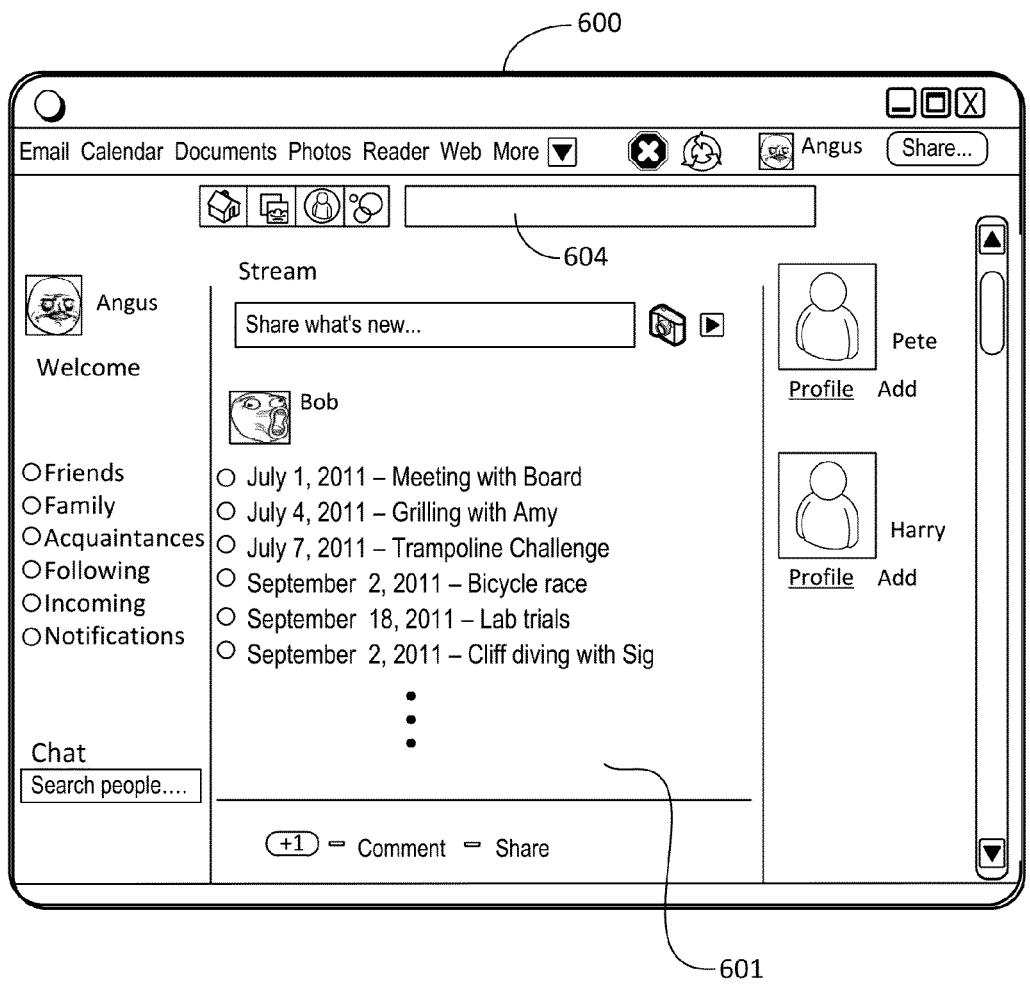
FIG. 6 is an example of an electronic portal containing an activity stream that includes activity-based social networks.

Icons corresponding to activity-based social networks may be incorporated (502) into a user's activity stream. This aspect of process 500 may be performed, e.g., by generator 214 and Web server program 213. As shown, for example, in FIG. 6, an activity stream 601 in an electronic portal 600 may include a listing of activity-based social networks that a user has participated in over a course of time (e.g., the lifetime of the user, or at least as long as the user has been part of the activity-based social network service). Activity stream 601 may list the icons for the social networks in, e.g., chronological order or in any other appropriate order (e.g., subject matter, alphabetically, designated priority, etc.). The order may be dictated by a user of the social networking service. For example, the user may have a profile, through which they configure their activity stream. As a new activity-based social network is created or joined, process 500 updates (503) the user's activity stream to include the new activity-based social network.

As noted above, filters may be associated with the activity stream, and may be used to filter data associated with a social network to identify a social network relevant to a query. For example, a participant may wish to identify social networks having a particular member. An electronic portal, such as Web page 600, that includes the activity stream may include a search field 604 for entering the identity of the participant. A filter associated with the activity stream receives information from this field, and filters data in the activity stream to identify which social network or networks include that participant. So, for example, a user may wish to identify activity-based social networks having John Smith as a member. The user can input "John Smith" into field 604. A search may be conducted of data in the icon itself and/or of its associated metadata to identify activity-based social networks of which John Smith is a member. Search results showing activity-based social networks having John Smith as a member may be presented to the user. Any appropriate filtering may be performed for the activity-based social networks.

The activity-based social networks described herein may be created as sub-networks of an existing social network. For example, the activity-based social networking service may be part of an existing social networking service. Members of that social networking service may avail themselves of the activity-based social networking features described herein. Alternatively, the activity-based social networks described herein may be independent of existing social networks. So, in this case, prospective members of an activity-based social network need not be members of the same social networking service beforehand in order to avail themselves of the activity-based social networking features described herein.

Members of an activity-based social network (which may or may not be a sub-network of an existing social network) may interact with other members in any appropriate manner. For example, a member of the activity-based social network may request information related to one or more other members of the activity-based social network (e.g., of the social sub-network). In response, the social network may retrieve the requested information and send the requested information to the computing device of that member. Members may also send instant messages to each other, post information about themselves, create profiles, and the like.

Example Alternative System Implementations

Figure 7:
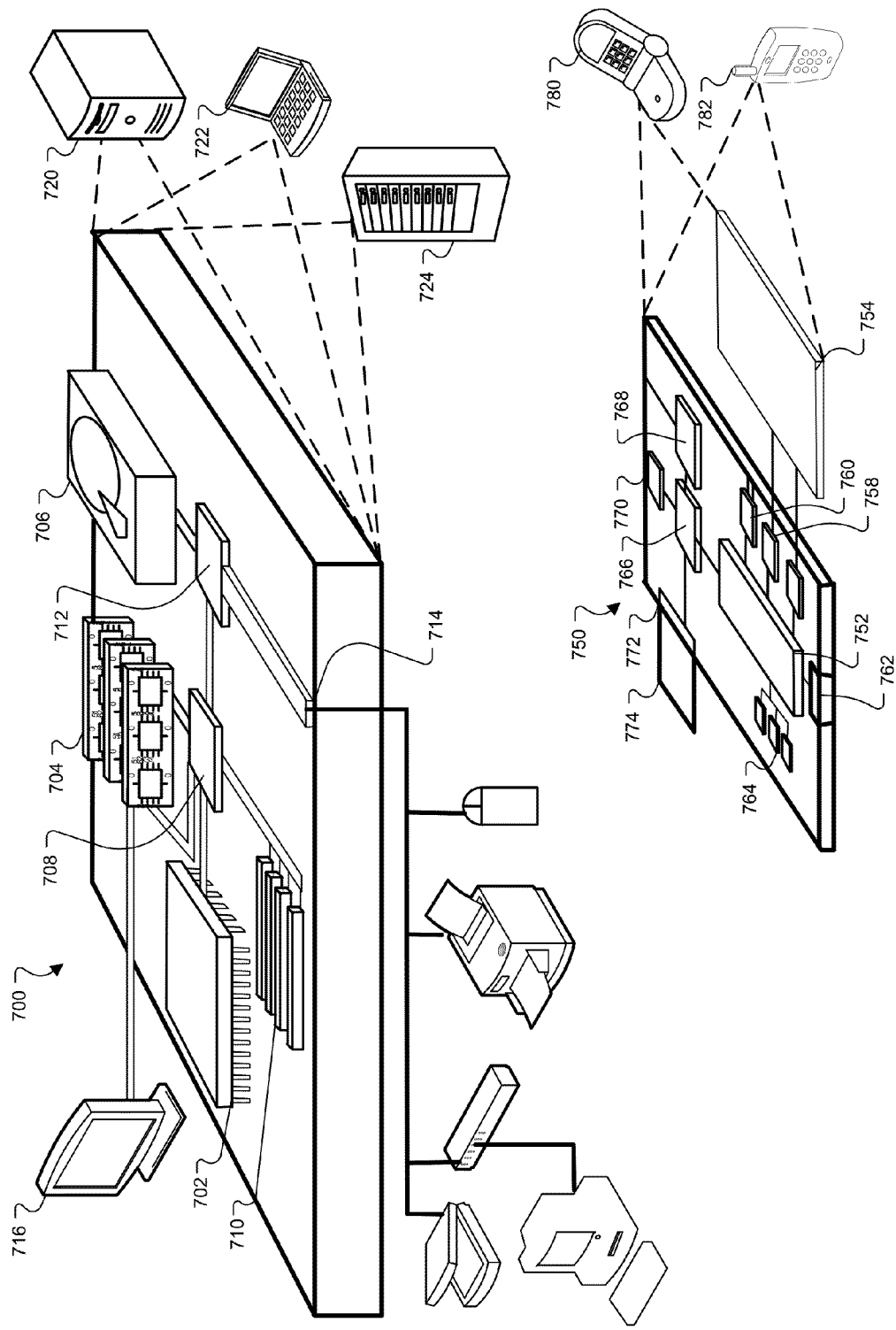
FIG. 7 shows examples of computing devices on which the processes described herein, or portions thereof, may be implemented.

FIG. 7 shows examples of computing devices on which the processes described herein, or portions thereof, may be implemented. In this regard, FIG. 7 shows an example of a generic computing device 700 and a generic mobile computing device 750, which may be used to implement all or part of the processes described herein. For example, server 207 may be implemented on computing device 700. Computing device 700 and/or mobile computing device 750 may represent the computing devices of FIGS. 1 and 2.

Computing device 700 is intended to represent various forms of digital computers, examples of which include laptops, desktops, workstations, personal digital assistants, servers, blade servers, mainframes, and other appropriate computers. Computing device 750 is intended to represent various forms of mobile devices, examples of which include personal digital assistants, cellular telephones, smartphones, and other similar computing devices. The components shown here, their connections and relationships, and their functions, are meant to be exemplary only, and are not meant to limit implementations of the technology described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, for example, display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, examples of which include a magnetic or optical disk.

The storage device 706 is capable of providing mass storage for the computing device 700. In one implementation, the storage device 706 may be or contain a computer-readable medium, examples of which include a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, including those described above. The information carrier may be a non-transitory computer- or machine-readable medium, for example, the memory 704, the storage device 706, memory on processor 702, or a propagated signal. For example, the information carrier may be a non-transitory, machine-readable storage medium.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, BLUETOOTH, Ethernet, wireless Ethernet) may be coupled to one or more input/output devices, e.g., a keyboard, a pointing device, a scanner, or a networking device, e.g., a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer, e.g., a laptop computer 722. Alternatively, components from computing device 700 may be combined with other components in a mobile device (not shown), e.g., device 750. Each of such devices may contain one or more of computing device 700, 750, and an entire system may be made up of multiple computing devices 700, 750 communicating with each other.

Computing device 750 includes a processor 752, memory 764, an input/output device, e.g. a display 754, a communication interface 766, and a transceiver 768, among other components. The device 750 may also be provided with a storage device, e.g., a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, e.g., control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided by the SIMM cards, along with additional information, e.g., placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, including those described above. The information carrier is a computer- or machine-readable medium, e.g., the memory 764, expansion memory 774, memory on processor 752, or a propagated signal that may be received, for example, over transceiver 768 or external interface 762.

Device 750 may communicate wirelessly through communication interface 766, which may include digital signal processing circuitry where necessary. Communication interface 766 may provide for communications under various modes or protocols, examples of which include GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, e.g., using a BLUETOOTH, Wi-Fi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, e.g., through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to a signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be a form of sensory feedback (e.g., visual feedback, auditory feedback, or tactile feedback); and input from the user can be received in a form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or a combination of such back end, middleware, or front end components. The components of the system can be interconnected by a form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the engine described herein can be separated, combined or incorporated into a single or combined engine. The engines depicted in the figures are not intended to limit the systems described herein to the software architectures shown therein.

For situations in which the systems and techniques discussed herein collect personal information about users, the users may be provided with an opportunity to opt in/out of programs or features that may collect personal information (e.g., information about a user's preferences or a user's current location). In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (e.g., to a city, zip code, or state level), so that a particular location of the user cannot be determined.

In some implementations, the engines described herein can be separated, combined or incorporated into a single or combined engine. The engines depicted in the figures are not intended to limit the systems described here to the software architectures shown in the figures.

Elements of different implementations described herein may be combined to form other implementations not specifically set forth above. Elements may be left out of the processes, computer programs, Web pages, etc. described herein without adversely affecting their operation. In addition, the logic flows depicted in the figures do not require the particular order shown, or sequential order, to achieve desirable results. Various separate elements may be combined into one or more individual elements to perform the functions described herein.

All processes described herein and variations thereof (referred to as "the processes") may contain functionality to ensure that party privacy is protected. To this end, the processes may be programmed to confirm that a user's membership in a social networking account is publicly known before divulging, to another party, that the user is a member. Likewise, the processes may be programmed to confirm that information about a party is publicly known before divulging that information to another party, or even before incorporating that information into a social graph.

Example implementations of the location-based social networks described herein may include, e.g., physical social networks, ephemeral social networks, or instant circles.

In the context of this disclosure, the terms social network and social networking service may be used interchangeably.

Other implementations not specifically described herein are also within the scope of the following claims.

What is claimed is:

1. A method performed by one or more computing devices, comprising:
   identifying, using the one or more computing devices, event participants participating in a real-time event currently happening based on information that is indicative of participation by the event participants in the real-time event;
   in response to identifying event participants participating in the real-time event based on the information, creating, using the one or more computing devices, an activity-based social network associated with the real-time event, the activity-based social network being accessible through an electronic portal, the electronic portal enabling interaction among the event participants in association with the real-time event; and
   outputting, using the one or more computing devices, data for the electronic portal to computing devices associated with the event participants.

2. The method of claim 1, wherein the activity-based social network is a sub-network of another social network.

3. The method of claim 1, further comprising:
   receiving, using the one or more computing devices, content from one or more of the event participants; and
   providing, using the one or more computing devices, the content to the event participants via the electronic portal.

4. The method of claim 1, further comprising:
   associating, using the one or more computing devices, the activity-based social network with an icon, the activity-based social network being accessible through the icon;
   incorporating, using the one or more computing devices, the icon into a stream of icons that are accessible to at least one of the event participants, the stream of icons corresponding to events associated with the at least one of the event participants; and
   outputting, using the one or more computing devices, data to make the stream of icons accessible to the at least one of the event participants.

5. The method of claim 4, wherein the data comprises a Web page; and
   wherein the Web page comprises features for initiating selective filtering of one or more social networks in the stream in response to a received input.

6. The method of claim 1, wherein the information comprises a near field communication token that is accessed by computing devices of the event participants, the token being received by the one or more computing devices.

7. The method of claim 1, wherein the information comprises an image of a quick response code.

8. The method of claim 1, wherein the information comprises an entry input by an event participant to a computing device of the event participant.

9. The method of claim 1, wherein the information comprises a token generated from sound information propagated to computing devices of the event participants.

10. The method of claim 1, wherein the information corresponds to a sequence of operations initiated manually on computing devices of the event participants.

11. The method of claim 1, wherein the information comprises data corresponding to physical contact between computing devices by at least two of the event participants.

12. The method of claim 1, wherein the information comprises at least one of images and video received from the event participants, the at least one of images and video having at least one feature in common.

13. The method of claim 1, wherein the computing devices of the event participants support wireless connection to other devices; and
   wherein the information is obtained through signals output to effect the wireless connection.

14. The method of claim 1, wherein the information is based on BLUETOOTH signals, wherein the information is based on global positioning system signals, or wherein the information is based on received signal strength indication signals.

15. The method of claim 1, further comprising:
   for at least one of the event participants, outputting data to the electronic portal that identifies other events associated with the at least one of the event participants.

16. A method performed by one or more processing devices, comprising:
   receiving, using the one or more processing devices, information from a computing device of an event participant participating in a real-time event currently happening;
   determining, using the one or more processing devices, that the information qualifies the event participant for membership in an activity-based social network associated with the real-time event;
   associating, using the one or more processing devices, the event participant with the activity-based social network; and
   enabling, using the one or more processing devices, access, by the event participant, to an electronic portal that provides access to the activity-based social network.

17. The method of claim 16, further comprising:
   creating, using the one or more processing devices, an icon corresponding to the real-time event, the icon allowing access to the activity-based social network;
   incorporating, using the one or more processing devices, the icon into a stream of icons corresponding to events associated with the event participant; and
   providing, using the one or more processing devices, the event participant with access to the stream of icons, the stream having one or more filters associated therewith for selectively filtering, for output, data from activity-based social networks associated with the stream.

18. The method of claim 16, wherein the information comprises a near field communication token; and
   wherein determining comprising comparing the near field communication token to one or more other near field communication tokens received from event participants in the real-time event.

19. The method of claim 16, wherein the information comprises an image of a quick response code; and
   wherein determining comprising comparing the image of the quick response code to a stored image of a quick response code.

20. The method of claim 16, wherein the information comprises an entry input by an event participant to a computing device of the event participant; and
   wherein determining comprising comparing the entry to one or more other entries received from event participants in the real-time event.

21. The method of claim 16, wherein the information comprises a token generated from sound information propagated to computing devices of the event participants; and
   wherein determining comprising comparing the token to one or more other tokens received from event participants in the real-time event.

22. The method of claim 16, wherein the information corresponds to a sequence of operations initiated manually on computing devices of the event participants; and wherein determining comprising comparing the sequence of operations to one or more other sequences of operations received from event participants in the real-time event.

23. The method of claim 16, wherein the information comprises data corresponding to physical contact between computing devices by at least two of the event participants.

24. The method of claim 16, wherein the information comprises an image or video; and
wherein determining comprising comparing the image or video to one or more other images or video received from event participants in the real-time event.

25. The method of claim 17, wherein the information is based on BLUETOOTH signals, wherein the information is based on global positioning system signals, or wherein the information is based on received signal strength indication signals.

26. A system comprising:
one or more processors;
an identification engine executable by the one or more processors to identify event participants participating in a real-time event currently happening based on information that is indicative of participation by the event participants in the real-time event;
a generator executable by the one or more processors in response to identifying event participants participating in the real-time event based on the information, to create an activity-based social network associated with the real-time event, the activity-based social network being accessible through an electronic portal, the electronic portal enabling interaction among the event participants in association with the real-time event; and
a server executable by the one or more processors to output data for the electronic portal to computing devices associated with the event participants.

27. A system comprising:
one or more processors;
an identification engine executable by the one or more processors to receive information from a computing device of an event participant in a real-time event currently happening event, and to determine that the information qualifies the event participant for membership in an activity-based social network associated with the real-time event;
a generator executable by the one or more processors to associate the event participant with the activity-based social network; and
a server executable by the one or more processors to enable access, by the event participant, to an electronic portal that provides access to the activity-based social network.

28. A computer program product comprising a non-transitory computer usable medium including a computer readable program, wherein the computer readable program when executed by one or more computing devices causes the one or more computing devices to perform steps comprising:
identifying event participants participating in a real-time event currently happening based on information that is indicative of participation by the event participants in the real-time event;
in response to identifying event participants participating in an event based on the information, creating an activity-based social network associated with the real-time event, the activity-based social network being accessible through an electronic portal, the electronic portal enabling interaction among the event participants in association with the real-time event; and
outputting data for the electronic portal to computing devices associated with the event participants.

29. The computer program product of claim 28, wherein the activity-based social network is a sub-network of another social network.

30. The computer program product of claim 28, further comprising:
receiving content from one or more of the event participants; and
providing the content to the event participants via the electronic portal.

31. The computer program product of claim 28, further comprising:
associating the activity-based social network with an icon, the activity-based social network being accessible through the icon;
incorporating the icon into a stream of icons that are accessible to at least one of the event participants, the stream of icons corresponding to events associated with the at least one of the event participants; and
outputting data to make the stream of icons accessible to the at least one of the event participants.

32. The computer program product of claim 31, wherein the data comprises a Web page; and
wherein the Web page comprises features for initiating selective filtering of one or more social networks in the stream in response to a received input.

33. The method of claim 1, wherein the information comprises a near field communication token that is accessed by computing devices of the event participants, the token being received by the one or more computing devices.

34. The method of claim 1, wherein the information comprises an image of a quick response code.

35. The method of claim 1, wherein the information comprises an entry input by an event participant to a computing device of the participant.

* * * * *